United States Patent [19]
Kiuchi et al.

[11] 4,365,880
[45] Dec. 28, 1982

[54] INDICATOR FOR CAMERA

[75] Inventors: Masayoshi Kiuchi, Yokohama; Masaharu Kawamura, Kawasaki; Hiroyasu Murakami, Tokyo, all of Japan

[73] Assignee: Canon Kabushiki Kaisha, Tokyo, Japan

[21] Appl. No.: 242,240

[22] Filed: Mar. 10, 1981

[30] Foreign Application Priority Data

Mar. 11, 1980 [JP] Japan .................. 55-31229[U]

[51] Int. Cl.³ .............................................. G03B 17/18
[52] U.S. Cl. .................................. 354/60 L; 354/289
[58] Field of Search .................. 354/53, 60 L, 289

[56] References Cited

U.S. PATENT DOCUMENTS 4,182,556 1/1980 Tano et al. ................. 354/60 L
4,192,590 3/1980 Kitaura ..................... 354/60 L X
4,286,849 9/1981 Uchidoi et al. ............. 354/289 X Primary Examiner—Michael L. Gellner
Attorney, Agent, or Firm—Toren, McGeady & Stanger

[57] ABSTRACT

In the disclosed indicator, a display responds to various photographic modes, i.e., shutter preference, program, etc. A control arrangement connected to the display changes the display in response to a control signal indicating that a selected shutter time is shorter or longer than a shutter time faster than hand vibrations.

8 Claims, 8 Drawing Figures

INDICATOR FOR CAMERA

BACKGROUND OF THE INVENTION

1. Field of the Invention

This invention relates to camera indicators, particularly to indicators capable not only of displaying photographic operating modes, but also to warning an operator that hand vibrations in hand held cameras may affect the exposures.

2. Description of the Prior Art

Recent advances in camera automation have resulted in automatic exposure control cameras which permit a photographer to select a desired photographic mode, such as a shutter priority mode, a program mode, etc. Cameras of this type are arranged to indicate the selected photographic modes. However, these indications do not appear in the camera's viewfinder. Camera viewfinders generally display exposure values, warnings concerning hand vibrations, battery check indications, indications showing the completion of charging of a flash device, etc. Such a viewfinder display would therefore become too complicated for the photographer if a photographic mode display were added to other indications within the finder.

SUMMARY OF THE INVENTION

It is an object of the invention to provide an indicator for a camera having a view finder display element arranged to be capable of not only displaying photographing modes but also displaying a warning against hand vibration.

It is another object of the invention to provide an indicator for a camera of a simple structure.

These and further objects, features and advantages of the invention will become apparent from the following detailed description of embodiments thereof taken in connection with the accompanying drawings.

DETAILED DESCRIPTION OF PREFERRED EMBODIMENTS

Figure 1:
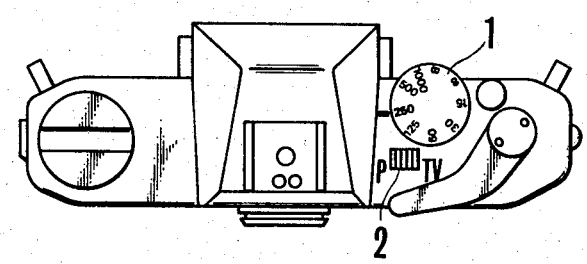
FIG. 1 is a top view of a camera showing it as an embodiment of the present invention.

In FIG. 1 which shows the upper part of a camera as an embodiment of the invention, there are provided a shutter dial 1 and a photographing i.e., photographic, mode selection knob 2 which is slidable for selection between a shutter preference mode and a program photographing mode.

Figure 2:
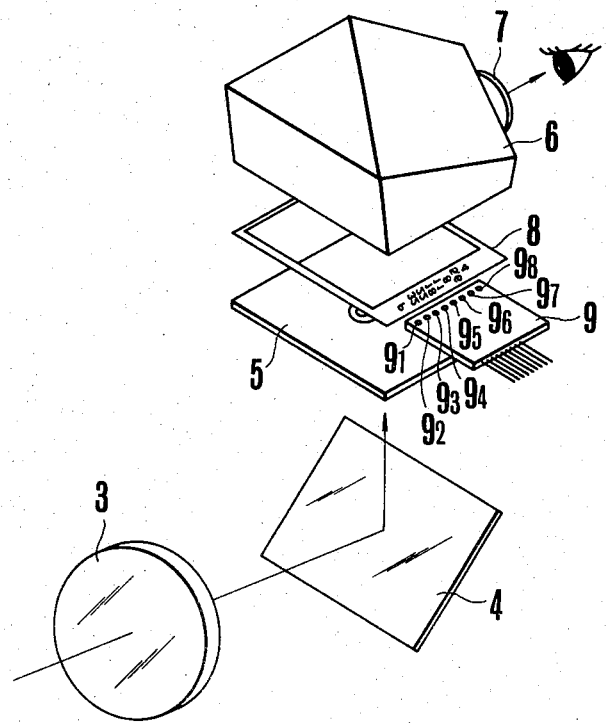
FIG. 2 is an illustration showing the structural arrangement of the optical system of a view finder optical system of the camera shown in FIG. 1.
Figure 3:
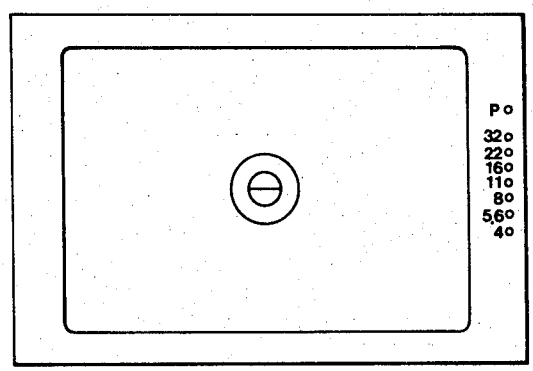
FIG. 3 is an illustration of the visual field of the view finder of the camera shown in FIGS. 1 and 2.

In FIG. 2 which shows a view finder optical system of the camera shown in FIG. 1, there are provided a photograph taking lens 3, a reflection mirror 4, a reticle plate 5, a pentagonal prism 6 and an eyepiece 7 and a field mask 8 disposed between the reticle plate 5 and the pentagonal prism 6. The field mask 8 is provided with aperture value graduations and a program photographing, i.e., photographic, mode mark which are arranged along one side edge of the field mask 8. The view finder optical system is also provided with a diode array 9. The diode array 9 includes a number of light emitting diodes $9_1$–$9_9$ corresponding to the program photographing mode mark and the aperture value graduations respectively. A transmission light from the photograph taking lens 3 is reflected by the reflection mirror 4 and is imaged on the reticle plate 5. The image thus formed on the reticle plate 5 is guided to the eyepiece 7 through the pentagonal prism 6. Meanwhile, the light from the reticle plate 5 is also transmitted by the aperture value graduations and the program photographing mode mark arranged along one side of the field mask 8. The light thus transmitted is guided also to the eyepiece 7 through the pentagonal prism 6. Therefore, the photographer is able to visually observe the view finder field as represented by FIG. 3 when he peeps through the eyepiece 7. When the photographing mode selection knob 2 is shifted to a position thereof for the program photographing mode, a light emitting diode which is arranged to correspond to the program photographing mode mark P emits a light to display it as shown in FIG. 3.

Figure 4:
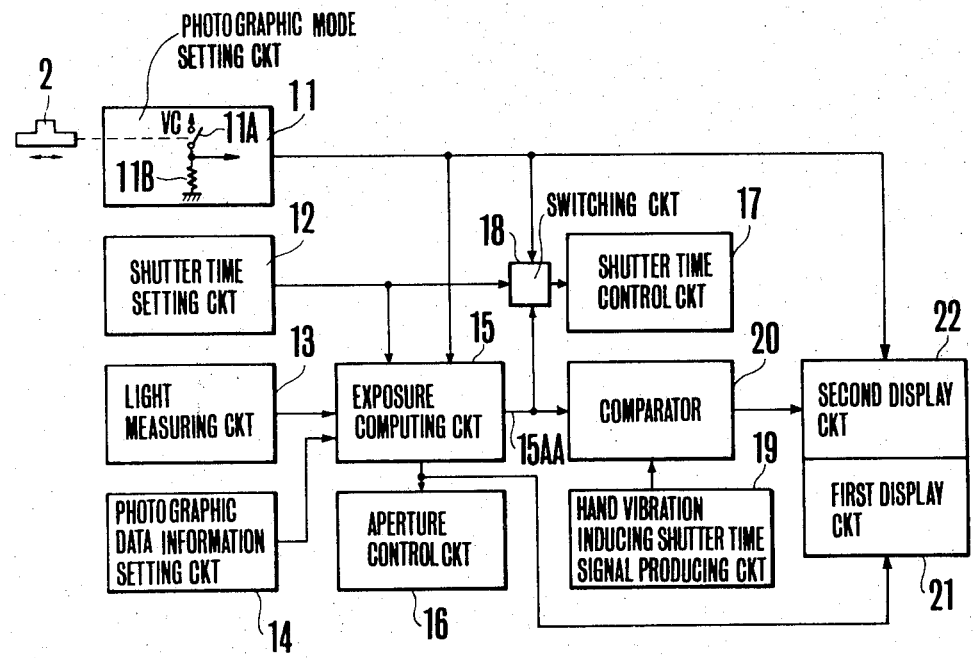
FIG. 4 is an electric circuit block diagram of the camera shown in FIGS. 1 and 2.

FIG. 4 diagrammatically shows the electrical block arrangement of the camera shown in FIGS. 1 and 2. Referring now to FIG. 4, when the photographing mode selection knob 2 has been set in the position of the program photographing mode, a switch 11A of a photographing, or photographic, mode setting circuit 11 is closed to produce a high level signal. Then, when the photographing mode selection knob 2 is shifted to the position for a shutter preference mode, the switch 11A opens to cause the circuit 11 to produce a low level signal. There is provided a shutter time setting circuit 12, which produces an electrical signal corresponding to a shutter time value set at the shutter dial 1. A light measuring circuit 13 is arranged to produce an electrical signal corresponding to the brightness of an object to be photographed. A photographic data information setting circuit 14 is arranged to produce an electrical signal corresponding to photographic data information such as film sensitivity. The signals from the photographing mode setting circuit 11, the shutter time setting circuit 12, the light measuring circuit 13 and the photographic data information setting circuit 14 are respectively arranged to be supplied to an exposure computing circuit 15. The exposure computing circuit 15 performs exposure determining computation and produces either an aperture signal or both a shutter time signal and the aperture signal in accordance with the signal produced by the photographing mode setting circuit 11. The aperture signal is arranged to be applied to an aperture control circuit 16. The shutter time signal which is produced either from the exposure computing circuit 15 or from the shutter time setting circuit 12 is arranged to be applied to a shutter time control circuit 17. The camera includes a switching circuit 18. The switching circuit 18 is arranged to have the shutter time signal from the exposure computing circuit 15 applied to the shutter time control circuit 17 when the level of the signal output of the photographing mode setting circuit 11 is high and to have the shutter time signal from the shutter time setting circuit 12 applied to the shutter time control circuit 17 when the level of the output of the photographing mode setting circuit 12 is low. The camera further includes a hand vibration inducing shutter time signal producing circuit 19 which is arranged to produce a signal corresponding to a hand vibration inducing shutter time value; a comparator circuit 20 which compares the shutter time signal coming from the exposure computing circuit 15 with the hand vibration inducing shutter time signal produced by the signal producing circuit 19, the comparator circuit 20 being arranged to produce a high level signal when the shutter time is longer than the hand vibration inducing shutter time value and to produce a low level signal when the shutter time is shorter than the hand vibration inducing shutter time value; a first display circuit 21 which is arranged to display an aperture value in accordance with the aperture signal coming from the exposure computing circuit 15; and a second display circuit 22 which displays the photographing mode selected in accordance with the signal coming from the photographing mode setting circuit 11. The second display circuit 22 is arranged to have a signal from the comparator circuit 20 applied thereto.

Figure 5:
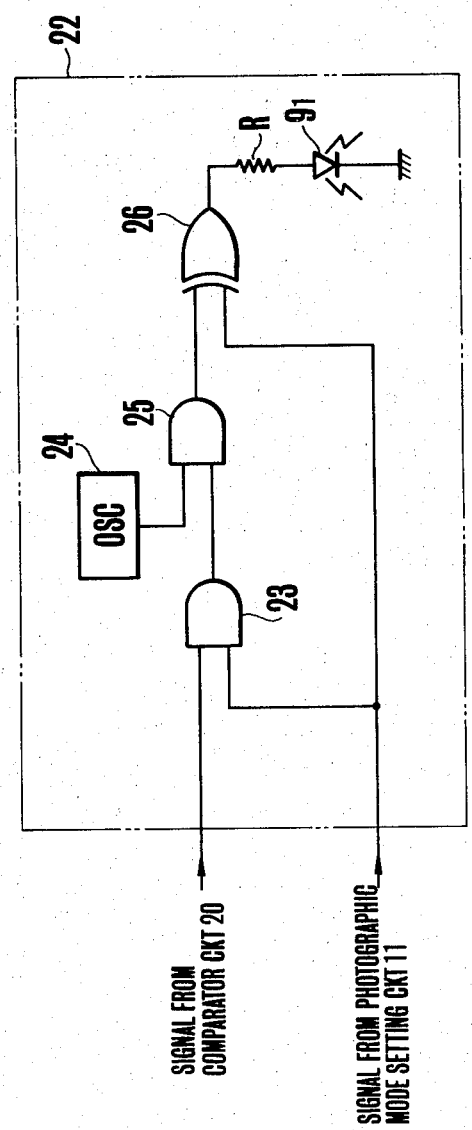
FIG. 5 is a circuit diagram of a second indicator circuit shown in FIG. 4.
Figure 6:
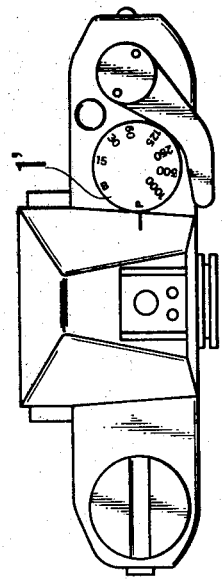
FIG. 6 is a top view of a modification example of the camera shown in FIG. 1.

The details of the second display circuit 22 is as shown in FIG. 5. The circuit 22 comprises an AND gate 23 which is arranged to have the output of the comparator circuit 20 and that of the photographing mode setting circuit 11 applied thereto a known pulse oscillator 24; an AND gate 25 which is arranged to have the outputs of the pulse oscillator 24 and the AND gate 23 applied thereto; an exclusive OR gate 26 which is arranged to have the output of the AND gate 25 and that of the photographing mode setting circuit 11 applied thereto; and a light emitting diode $9_1$ which is shown in FIG. 2. The light emitting diode $9_1$ is arranged to have the output of the exclusive OR gate 26 applied thereto through a resistor.

The camera which is arranged as described in the foregoing operates in the following manner. When the photographic mode selection knob 2 is set at the position TV for the shutter preference mode, the switch 11A of the photographic mode setting circuit 11 closes to cause the circuit 11 produce a low level signal. Then, the low level signal is applied to the gates 23 and 26 of the second display circuit 22. As a result, the level of the output of the AND gate 23 becomes low. Accordingly, the level of the output of another AND gate 25 also becomes low. Since the output of the exclusive OR gate 26 is thus at a low level, it does not cause the light emitting diode $9_1$ to emit a light. With the light emitting diode $9_1$ which corresponds to the program photographing mode mark P thus not emitting a light for display, it informs the photographer that the program photographic mode has not been selected and the photographic operation is being performed in the shutter preference mode.

Further, the low level signal from the mode setting circuit 11 is also applied to the switching circuit 18. The switching circuit 18 then causes the signal produced by the shutter time setting circuit 12 to be applied to the shutter time control circuit 17. Therefore, when a shutter time value is set by turning the shutter dial 1, a signal which corresponds to the set shutter time value is applied from the shutter time setting circuit 12 to the shutter time control circuit 17. Then, when a film sensitivity value is set by means of a dial which is not shown, the photographic data information setting circuit 14 produces an output corresponding to the set film sensitivity value. Meanwhile, the light measuring circuit 13 measures a transmission light coming from the photograph taking lens 3 and produces a signal representative of the brightness of an object to be photographed. When the low level signal from the photographing mode setting circuit 11 is received by the exposure computing circuit 15, the circuit 15 performs a computing operation on the shutter time information from the shutter time setting circuit 12, the brightness information from the light measuring circuit 13 and the photographic data information from the photographic data information setting circuit 14. The exposure computing circuit 15 then produces an aperture signal as a result of the computing operation. This aperture signal is applied not only to the aperture control circuit 16 but also to the first display circuit 21. Then, the first display circuit 21 has one of the light emitting diodes $9_2$ through $9_8$ emit a light to display an aperture value represented by the aperture signal. Meanwhile, the aperture control circuit 16 operates in response to a release action on the camera to have the diaphragm aperture adjusted to an aperture value in accordance with the aperture signal. After that, the shutter time control circuit 17 operates to have the shutter controlled in accordance with the shutter time signal.

For the case of photographing in the program mode, the photographic mode selection knob 2 is set to the position P. In response to the mode selecting operation on the knob 2, the photographic mode setting circuit 11 produces a high level signal. The high level signal is then applied to the gates 23 and 26 of the second display circuit 22. Meanwhile, the high level signal from the photographing mode setting circuit 11 is also applied to the switching circuit 18. The switching circuit 18 in turn causes the shutter time signal from the exposure computing circuit 15 to be applied to the shutter time control circuit 17. Therefore, under this condition, the signal corresponding to the shutter time value set by turning the shutter dial 1 is never applied to the shutter time control circuit 17 even if the shutter dial is thus operated. Then, when a film sensitivity value is set by operating a dial which is not shown, a signal corresponding to the setting value of film sensitivity is produced from the photographic data information setting circuit 14. The light measuring circuit 13 then measures the transmission light coming through the photograph taking lens 3 and produces a signal corresponding to the brightness of the object to be photographed. With the high level signal from the photographing mode setting circuit 11 supplied to the exposure computing circuit 15, the circuit 15 performs a computing operation on the brightness information coming from the light measuring circuit 13 and the photographic data information coming from the photographic data information setting circuit 14. As a result of this operation, the exposure computing circuit 15 produces an aperture signal and a shutter time signal. The aperture signal thus produced is applied not only to the aperture control circuit 16 but also to the first display circuit 21. With the aperture signal applied, the first display circuit 21 causes one of the light emitting diodes $9_2$ through $9_8$ to emit a light to display an aperture value corresponding to the aperture signal. In the meantime, the shutter time signal produced by the exposure computing circuit 15 is applied to the comparator circuit 20 while it is applied to the shutter time control circuit 17 through the switching circuit 18. The comparator circuit 20 compares this shutter time signal with the hand vibration inducing shutter time value signal coming from the signal producing circuit 19. In case where the shutter time signal from the exposure computing circuit 15 is corresponding to a shutter time value which is shorter than the hand vibration inducing shutter time value, the comparator circuit 20 produces a low level signal. The low level signal thus produced from the comparator circuit 20 is applied to the AND gate 23 of the second display circuit 22. This causes the AND gate 23 to produce a low level output which in turn makes the level of the output of the AND gate 25 low. Meanwhile, since the above stated output of the photographing mode setting circuit 11 is at a high level, the level of the output of the exclusive OR gate 26 is high to cause the light emitting diode $9_1$ to emit a light. With the light emitting diode $9_1$ which corresponds to the program photographing mode mark P thus caused to emit the light, the program photographing mode is displayed thereby. Conversely, if the shutter time signal produced by the exposure computing circuit 15 corresponds to a shutter time value longer than the hand vibration inducing shutter time value signal, the comparator circuit 20 produces a high level signal therefrom. The high level signal produced by the comparator circuit 20 is applied to the AND gate 23 of the second display circuit 22. Then, since the above stated output of the photographing mode setting circuit 11 is also at a high level, the level of the output of the AND gate 23 becomes high. This causes the other AND gate 25 to produce oscillation pulses which are similar to the pulses of the pulse oscillator 24. This causes the exclusive OR gate 26 to produce an oscillation pulse output which is obtained with the pulse output signal of the AND gate 25 inverted. Then this causes the light emitting diode $9_1$ to flicker in such a way as to give a warning against the possibility of having a blurred photograph due to hand vibration.

The selection of the program photographing mode is thus indicated by the light emission from the light emitting diode $9_1$ which corresponds to the program photographing mode mark P. However, if the light emitting diode $9_1$ is flickering, it is giving a warning that the shutter time of the camera in the program photographing mode is within the range of hand vibration inducing shutter time values.

On the other hand, when the light emitting diode is in a displaying state with continuous light emission instead of a flickering display state, the camera is suitable for a release action. In response to the release action of the camera, the aperture control circuit 16 operates to have the diaphragm aperture adjusted to an aperture value in accordance with the aperture signal. Following this, the shutter time control circuit operates to have the shutter controlled in accordance with the shutter time signal.

While the embodiment has been described as having the photographing mode selection knob provided for the sole purpose of selecting the photographing modes, the shutter dial may be arranged to be usable for selection of the photographing modes in addition to the purpose of setting a shutter time value.

In the case of this particular embodiment, the selection of the shutter preference mode is arranged to be indicated by having no light emitted by the light emitting diode which corresponds to the program photographing mode mark P. However, it goes without saying that this arrangement may be replaced with a different arrangement in which there are provided a shutter preference mode mark TV and an additional light emitting diode arranged to correspond to the mark TV.

Further, this embodiment has been described as permitting selection between the program photographing mode and the shutter preference mode. However, the invention is not limited to this. A diaphragm preference mode AV may be either arranged in place of one of the above stated two modes or arranged in addition to these modes in such a manner as to have a light emitting diode arranged to corresponds to the mode AV and to flicker for giving a warning against hand vibration or something else. In accordance with the present invention, the display elements are not limited to light emitting diodes but may be replaced with anything that is capable of flickering, such as liquid crystals or the like.

Figure 7:
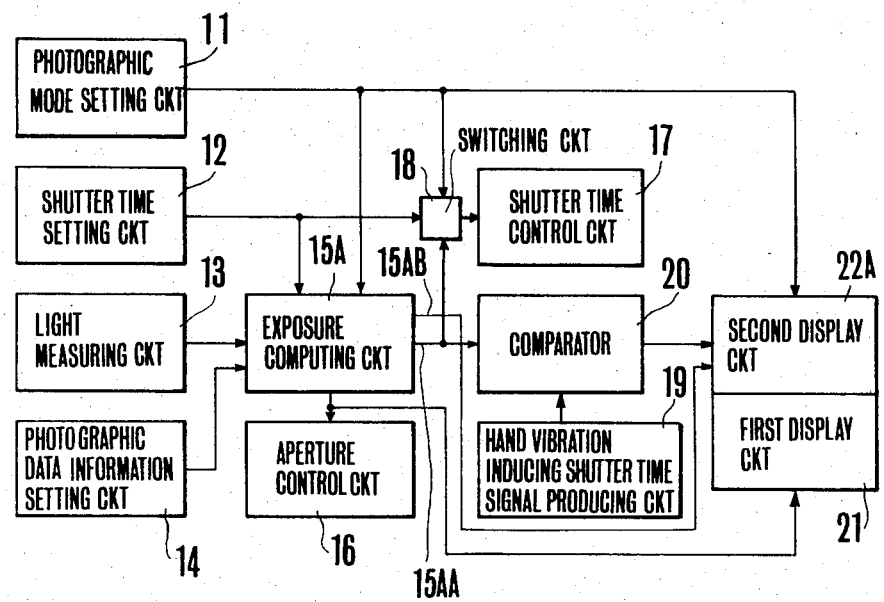
FIG. 7 is a circuit block diagram showing a camera as another embodiment of the invention.

FIG. 7 is a block diagram showing another embodiment of the present invention as applied to a camera. In this embodiment, the exposure computing circuit 15 which is used for the first embodiment shown in FIG. 4 is replaced with a similar circuit 15A. The exposure computing circuit 15A differs from the exposure computing circuit 15 only in that the circuit 15A is provided with an additional output terminal 15AB which is arranged to produce a high level signal when the shutter time signal obtained as a result of computation exceeds the exposure controllable range of the camera in use and to produce a low level signal when the shutter time signal obtained as a result of computation is within the exposure controllable range of the camera. The embodiment is provided with a display circuit 22A which is similar to the second display circuit 22 employed in the first embodiment shown in FIG. 4. The display circuit 22A differs from the display circuit 22 only in that the former 22A is provided with an additional circuit for processing the signal produced from the above stated output terminal 15AB of the exposure computing circuit 15A. With the exception of the above stated elements, all of other elements shown in FIG. 7 are arranged to perform the same functions as corresponding elements shown in FIG. 4 with the same reference numerals. Therefore, description of these same elements is omitted here.

Figure 8:
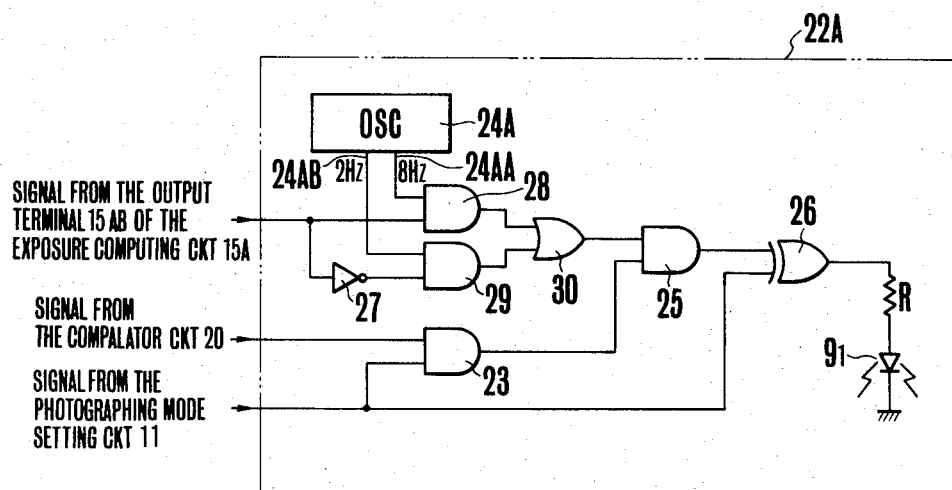
FIG. 8 is a circuit diagram of a second indicator circuit shown in FIG. 7.

The details of the display circuit 22A which is shown in FIG. 7 are as shown in FIG. 8. Referring now to FIG. 8, the display circuit 22A comprises: An inverter circuit 27 which serves to invert the signal from the output terminal 15AB of the exposure computing circuit 15; a pulse oscillator 24A which is similar to the pulse oscillator 24 shown in FIG. 5; and an AND gate 28. The AND gate 28 is provided with a first input terminal which receives a pulse signal from the first output terminal 24AA of the pulse oscillator 24A which produces a pulse train of 8 Hz and a second input terminal which receives the signal from the output terminal 15AB of the exposure computing circuit 15. The circuit 22A also includes another AND gate 29 provided with a first input terminal which is arranged to receive a pulse signal of 2 Hz produced from the second output terminal 24AB of the pulse oscillator 24A and a second input terminal which is arranged to receive the output of the inverter circuit 27; and an OR gate 30. In FIG. 8, like in FIG. 7, the elements that perform the same functions as those shown in FIG. 5 are indicated by the same reference numerals as those of the corresponding elements shown in FIG. 5 and description of them is also omitted here. The camera which is arranged in the manner as shown in FIGS. 7 and 8 operates in the same manner as the first embodiment shown in FIGS. from 1 through 5 with the exception of some points, which are as described below:

First, in the program photographing mode, the output terminal 15AB of the exposure computing circuit 15A produces a low level output signal when the shutter time signal obtained as a result of computation performed at the exposure computing circuit 15A is longer than the hand vibration inducing shutter time value and is within the exposure controllable range. Accordingly, the level of the output of the AND gate 28 becomes low while the level of the output of the inverter circuit 27 becomes high. A pulse train of 2 Hz from the pulse oscillator 24A, therefore, is applied to one of the input terminals of the AND gate 25 through the AND gate 29 and the OR gate 30. Then, since the camera is in the program photographing mode and the shutter time signal is longer than the hand vibration inducing shutter time value as mentioned in the foregoing, the level of the output of the AND gate 23 is high. Therefore, the AND gate 25 produces the pulse signal of 2 Hz which comes from the pulse oscillator 24A. The exclusive OR gate 26 thus produces also the pulse signal of 2 Hz to cause thereby the light emitting diode $9_1$ to produce a hand vibration warning signal at a frequency of 2 Hz.

On the other hand, when the shutter time signal obtained as a result of computation by the exposure computing circuit 15A is outside of the exposure controllable range of the camera, the level of the output of the output terminal 15AB of the exposure computing circuit 15A is high. Therefore, the inverter circuit 27 produces a low level output. Then, contrary to the above stated case, it is the AND gate 28 that is selected in this case. Thus, a pulse signal of 8 Hz produced from the pulse oscillator 24A is applied to one of the input terminals of the AND gate 25 through the OR gate 30. Meanwhile, the shutter time signal being not within the exposure control range of the camera as mentioned in the foregoing, the level of the output of the AND gate 23 is high. Accordingly, the AND gate 25 produces the pulse signal of 8 Hz which comes from the pulse oscillator 24A. As a result of this, the light emitting diode $9_1$ flickers at a frequency of 8 Hz to inform the photographer that the shutter time signal is not within the exposure control range of the camera.

As has been described in detail in the foregoing, in accordance with the present invention, a photographing mode display element employed in a camera which permits selection of various photographing modes can be arranged not only to be capable of displaying the photographing mode selected but also to be capable of giving a warning, by flickering, against hand vibration or the like. This invented arrangement permits reduction in the number of display elements required for an orderly display, so that the problem of excessively complicated display due to the use of too many display elements can be solved in accordance with the invention.

What is claimed is:
1. An indicator for a camera comprising:
   (a) indicating means responsive to mode signals for displaying an indicating state which is variable in accordance with various photographic mode signals to be received; and
   (b) control means connected to said indicating means to change the indicating state of said indicating means in response to a first signal indicative of that a shutter time value obtained in longer than a hand vibration inducing shutter time value.
2. An indicator according to claim 1, wherein said indicating means consists of a light emitting diode.
3. An indicator according to claim 1, wherein said control means includes a circuit which, in response to said first signal, produces a first driving signal for causing said indicating means to continuously light up and which, in response to said second signal, produces a second driving signal for causing said indicating means to light up intermittently.
4. An indicator for a camera comprising:
   (a) indicating means for producing an indication which is variable in accordance with various photographic mode signals to be received; and
   (b) control means arranged to supply a first driving signal of a predetermined unvarying level to said indicating means in response to a first input signal which indicates that a shutter time value obtained is shorter than a time value at which a camera is responsive to hand vibrations and to supply a second driving signal of a continuously fluctuating level to said indicating means in response to a second input signal which indicates that said shutter time value is longer than said hand vibration inducing shutter time value.
5. An indicator according to claim 4, wherein said indicating means consists of a light emitting diode.
6. An indicator according to claim 4, wherein said control means includes oscillating circuit means.
7. An indicator for a camera comprising:
   (a) indicating means for producing an indicating state in accordance with a photographic mode signal to be received; and
   (b) control means connected to said indicating means to change the indicating state of said indicating means into another indicating state in response to an alarm signal.
8. An indicator for a camera comprising:
   (a) indicating means selectively deenergized or continuously energized to represent shutter preference and program modes; and
   (b) control means connected to said indicating means to intermittently energize the indicating means in response to a signal indicative of that a shutter time value obtained is longer than a shutter time value inducing a hand vibration.

* * * * *